United States Patent [19]

Armbrust

[11] 4,362,445
[45] Dec. 7, 1982

[54] FLOATING BORING BAR CARTRIDGE

[75] Inventor: William D. Armbrust, Greensburg, Pa.

[73] Assignee: Kennametal Inc., Latrobe, Pa.

[21] Appl. No.: 166,468

[22] Filed: Jul. 7, 1980

[51] Int. Cl.³ ............................................. B23B 29/03
[52] U.S. Cl. ................................... 408/182; 408/185
[58] Field of Search .............. 408/182, 183, 181, 185, 408/153

[56] References Cited

U.S. PATENT DOCUMENTS

| 2,364,259 | 12/1944 | Welsby et al. | 408/181 |
| 2,371,127 | 3/1945 | Calhoun | 408/185 |
| 4,003,670 | 1/1977 | Ewing | 408/185 |
| 4,014,623 | 3/1977 | Eckle | 408/183 |
| 4,247,233 | 1/1981 | Kraemer | 408/153 |

FOREIGN PATENT DOCUMENTS 2251537 5/1974 Fed. Rep. of Germany ...... 408/182

Primary Examiner—Leonidas Vlachos
Attorney, Agent, or Firm—Lawrence R. Burns; Ira D. Blecker

[57] ABSTRACT

This invention relates to an adjustable floating boring bar cartridge having indexable cutting inserts mounted on it. Two indexable cutting inserts are mounted on a cartridge such that one is held in a fixed position in one lateral face of the cartridge while the other is held in an opposite face of the cartridge such that it can be adjusted laterally inward and outward.

12 Claims, 13 Drawing Figures

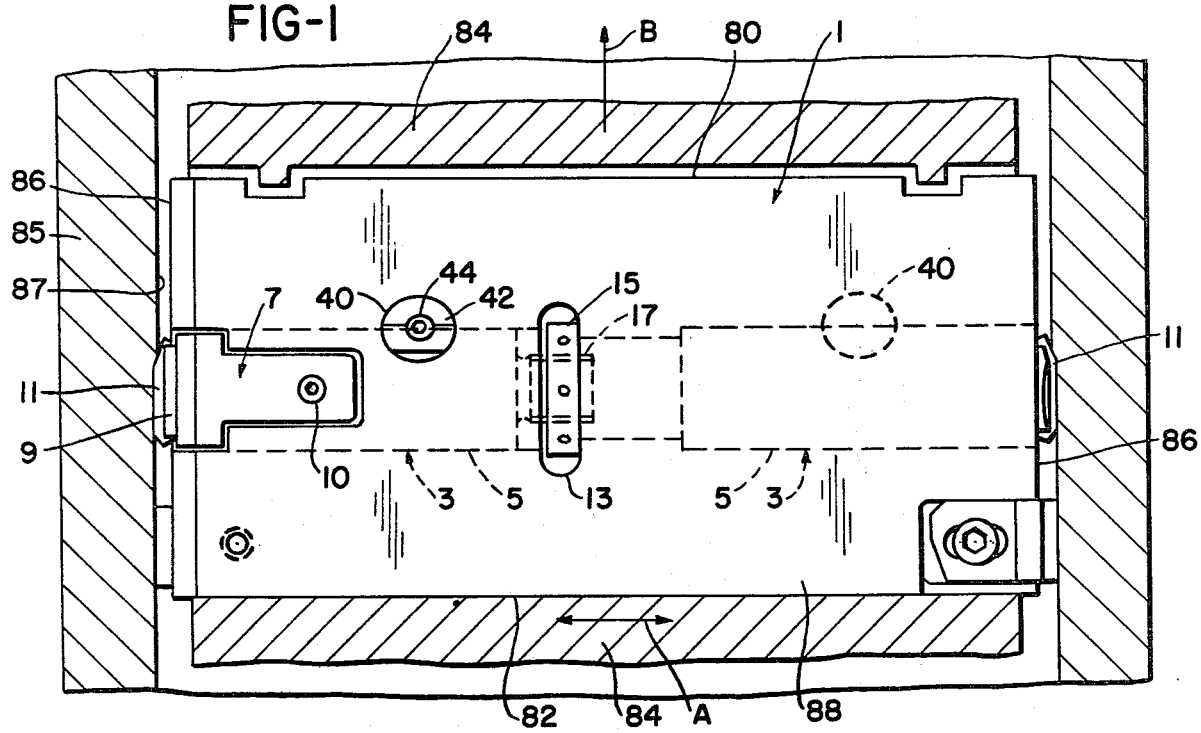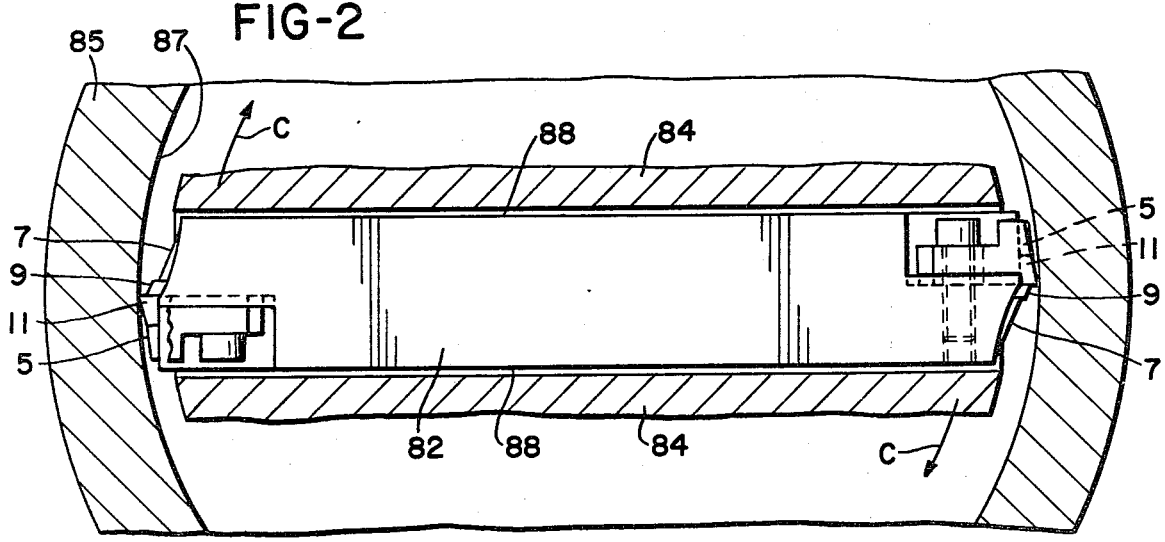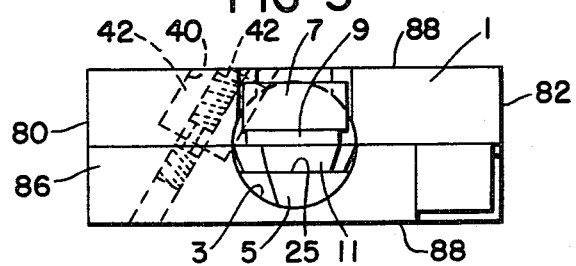

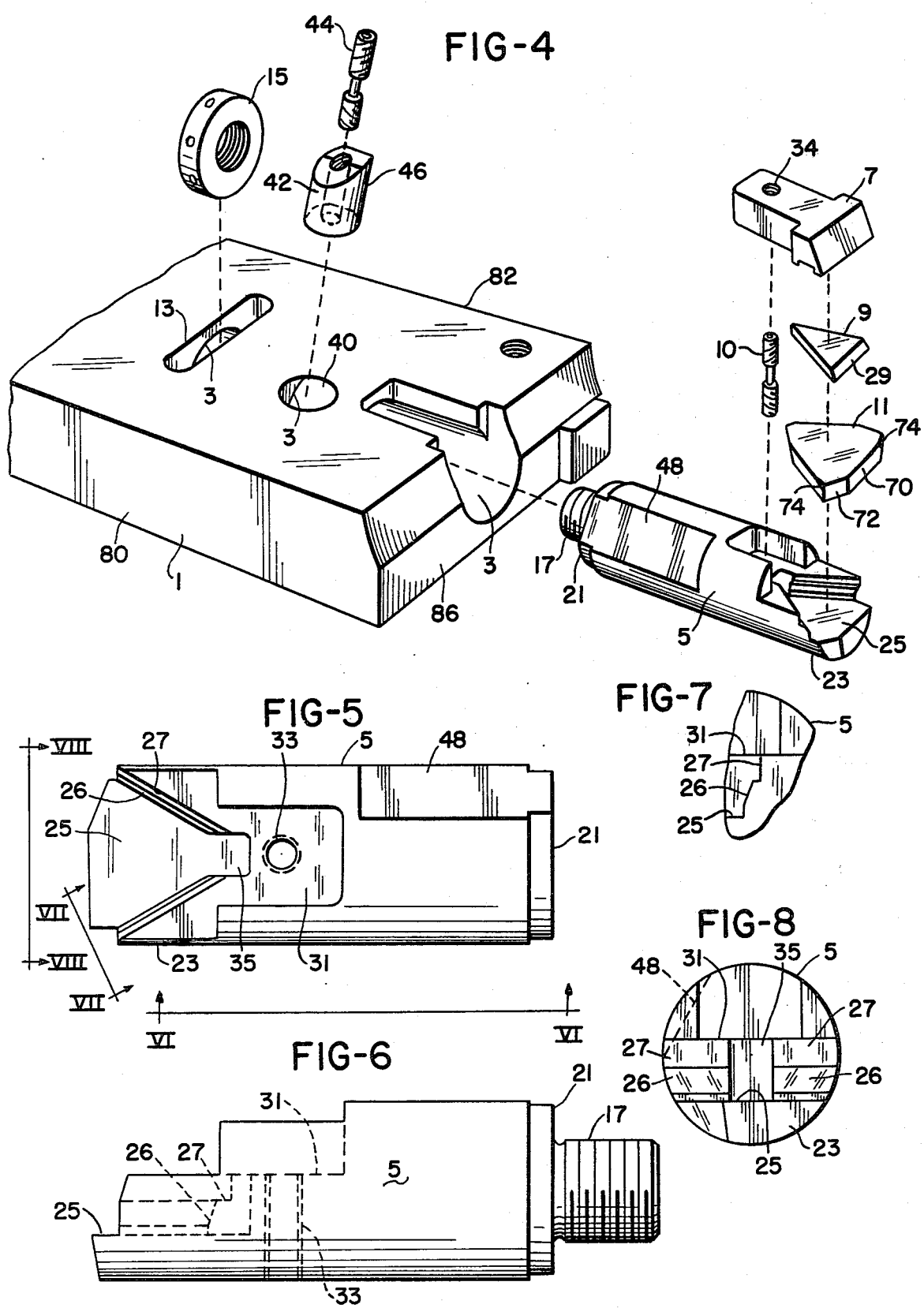

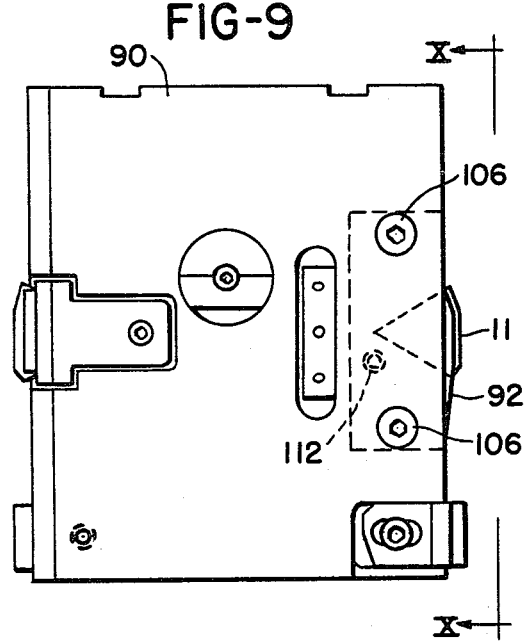
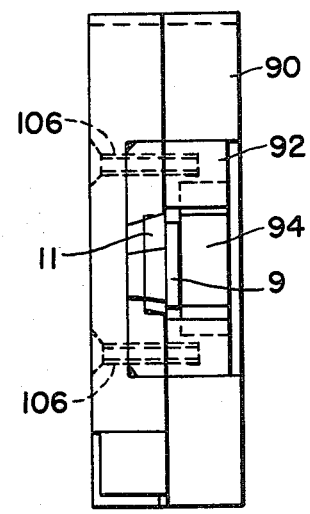
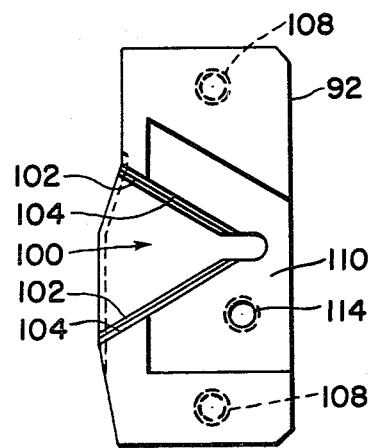
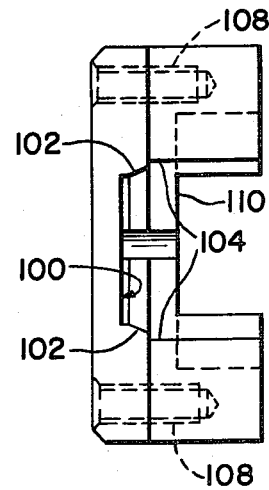
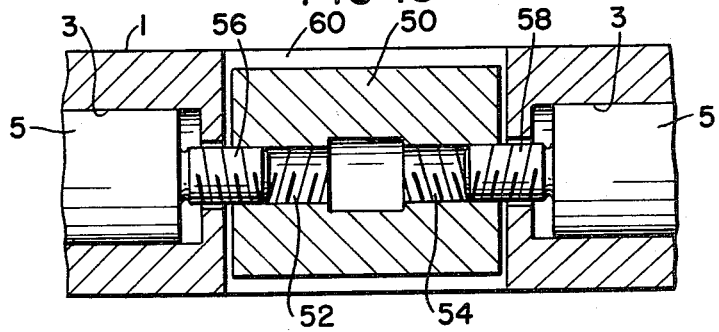

FLOATING BORING BAR CARTRIDGE

BACKGROUND OF THE INVENTION

This invention pertains to the field of floating boring bar cartridges. It more particularly pertains to the field of adjustable floating boring bar cartridges having indexable cutting inserts for use in broadnosing (or skiving) applications.

In the past, adjustable floating boring bar cartridges had two oppositely facing single cutting edge inserts, of a rectangular-like geometry, mounted in, and extending out of, the lateral faces of the cartridge. Movement of the cutting inserts outward to the desired final bore size is achieved by movement of a wedge-like adjusting plate, located within the cartridge and between the cutting inserts. The adjusting plate has two oppositely facing lateral sides which are inclined inwardly and forwardly. Each of these two inclined faces mates and abuts against a complimentary inclined face on the rear of each cutting insert.

The turning of an adjusting screw, which is joined to adjusting plate, pulls the plate forward, thus producing a wedging action which forces the cutting edge of each insert to further protrude from the lateral faces of the cartridge. Each insert is then locked in position by abutment with the end of a locking screw located above it.

This mechanism for adjusting the position of inserts does not readily facilitate inward adjustment. To achieve an inward adjustment, the adjusting plate is first moved to the rear of the cartridge, that is, out of abutment with the rear faces of the inserts. Next, the operator manually presses the inserts into abutment with the wedge-like member. At this point, the inserts are farther inward than actually desired. Adjustment to the final position is achieved as before, by wedging the inserts outwardly by moving the adjusting plate forward.

In addition to the above awkwardness in the adjustment of the inserts, the above cartridge design cannot be used with indexable cutting inserts. The use of indexable cutting inserts eliminates the need for resharpening of cutting edges as had been done with the above single edge inserts. Resharpening of a cutting edge offered an opportunity for introducing defects into the cutting edge which could cause the insert to fail during machining, possibly damaging the workpiece and/or the cartridge.

BRIEF SUMMARY OF THE INVENTION

According to the present invention, an adjustable floating boring bar cartridge is provided with oppositely extending apertures in its opposite lateral faces. Held in each of these apertures is an indexable cutting insert seating device having a releasable clamping mechanism for locking an indexable insert into its seat. At least one of these seating devices is laterally adjustable inward and outward so that the cutting edge of the insert may be easily and precisely advanced and retracted to the desired location outside of the lateral face of the cartridge.

The seating device with the insert and clamping mechanism on it has a cross sectional configuration and size which closely conforms to the aperture so that it may slide into the aperture. Any openings or grooves formed between the seating device, insert, clamp and the cartridge body, and which are connected with the exposed surfaces of these parts near the cutting edge of the insert, have been minimized so as to reduce the likelihood of machining chips being caught in these openings and causing a possible jamming of the cartridge in the bore being machined. For the same reason, the outer surfaces of the insert seating device, insert clamp and chip breaker (when used) have been profiled where possible to conform as closely as possible to the outer profile of the cartridge body.

With the foregoing in mind, a primary objective of the present invention is the provision of an adjustable floating boring bar cartridge with an indexable cutting insert.

Another object is the provision of an adjustable floating boring bar cartridge with insert adjustment mechanism that allows the cutting edge of the insert to be advanced or retracted with equal ease and precision.

A further object is the provision of an adjustable floating boring bar cartridge in which only one of the cutting inserts can be adjustably positioned.

BRIEF DESCRIPTION OF THE DRAWINGS

The exact nature of the present invention will become more clearly apparent upon reference to the following detailed specification taken in connection with the accompanying drawings in which:

FIG. 1 is a plan view of an embodiment of a floating boring bar cartridge according to the present invention, shown held in a boring bar head while machining the bore of a workpiece.

FIG. 2 is a rear end view of a floating boring bar cartridge according to the present invention as shown in FIG. 1.

FIG. 3 is a lateral view of a floating boring bar cartridge according to the present invention.

FIG. 4 is an exploded depiction of one end of a floating boring bar cartridge according to the present invention.

FIG. 5 is a plan view of the insert seating device according to the present invention.

FIG. 6 is an alternative embodiment of the insert seating device shown in FIG. 5, viewed along arrows VI—VI.

FIG. 7 is a partial view of the insert seating device shown in FIG. 5, viewed along arrows VII—VII.

FIG. 8 is a view of the outer end of the insert seating device shown in FIG. 5, viewed along arrows VIII—VIII.

FIG. 9 is an alternate embodiment of a floating boring bar cartridge according to the present invention.

FIG. 10 shows the floating boring bar cartridge shown in FIG. 9, viewed along arrows X—X.

FIG. 11 is a top plan view of the alternate embodiment of the insert seating device shown in FIGS. 9 and 10.

FIG. 12 is a side view of the insert seating device shown in FIG. 11.

FIG. 13 is a partial transverse section through a floating boring bar cartridge according to the present invention showing a means for simultaneously adjusting the position of both insert seating devices.

DETAILED DESCRIPTION OF THE INVENTION

Referring to the drawings somewhat more in detail, FIGS. 1 through 3 show an adjustable floating boring bar cartridge 1 which is adapted to be held in a boring bar head 84 such that said cartridge may move freely in a lateral direction indicated by arrows A while being driven in a forward direction shown by arrow B along the axis of rotational symmetry of a workpiece 85, bore 87, while, at the same time, rotating about the axis of the bore. The direction of rotation is indicated by arrow C.

The cartridge as shown in the drawings has a forward face 80, a rear face 82, and major side faces 88 joining the rear face 82 to the forward face 80.

Two lateral faces 82 are also shown. They join the forward face 80 to rear face 82 while, also, joining the two major side faces 88. The lateral faces 86 each has an aperture 3 extending laterally inward. The axes of these apertures are colinear. Each of the major side faces 88 has a recess 40 which intersects one of said apertures 3. In addition, the major side faces 88 have a slot 13 which communicates between the major side faces 88 and one of the apertures 3.

An alternative embodiment of this device (not shown) would allow an additional slot 13 to intersect the other aperture 3. Located in each of the apertures 3 is an insert seating device 5 (i.e., a means for releasably holding an indexable cutting insert 11). These insert seating devices 5 have a cross section which is similar to and substantially fills the cross section of the apertures 3. Seated in each of these insert seating devices 5 is an indexable cutting insert 11. These inserts 11 extend laterally outward beyond the insert seating device 5 and the lateral face 86. The insert 11 is clamped to the insert seating device 5 by a clamp 7 which is releasably held to the insert seating device 5 by a double ended screw 10.

The insert 11 may or may not have a chip breaking structure as an integral part of its top surface. As shown in the drawings, there is not a chip breaking structure on the top surface of the insert 11. There is however, a replaceable chip breaking structure 9 located between the top of the insert 11 and the clamp 7.

Located in the recesses 40 is a clamping and orienting mechanism 42 which is abutting against the insert seating device 5. The clamping and orienting device 42 is releasably held by a double ended screw 44. Located on the inner end of at least one of the insert seating devices 5 is a threaded section 17. Threaded section 17, when the insert seating device 5 is in the aperture 3, is located in the slot 13. Mounted on threaded section 17 is an adjusting nut 15 which is also located in slot 13. Rotation of the adjusting nut 15 on threaded section 17 will cause the insert seating device and, the therefore, the insert 11 which it holds, to move either laterally inward or outward.

Each insert 11 is followed by a bushing 120 which contacts the inside diameter of the base 87. The left side bushing 120 in FIG. 2 has been removed so as to leave the insert 11 and insert seating device 5 visible in this view.

FIG. 4 shows an exploded portion of the boring bar cartridge 1. It can be seen that the clamping and orienting device 42 has an abutment surface 46 which is brought into abutment with a mating abutment surface 48 on the insert seating device 5 by a double ended screw 44. It can also be seen, referring to FIGS. 4 and 3, that said clamping and orienting device is located forward of the insert seating device 5 in both the sense of the direction in which the boring bar head is traveling and the direction in which it is rotating. It is believed that this location supplies a more secure clamping than other possible locations.

FIGS. 5 through 8 show a more detailed look at the insert seating devices 5. FIG. 5 is a top plan view of an insert seating device 5. It shows that said device 5 has an inner end 21 and an outer end 23. Located at the outer end 23 are insert seating surfaces 26 and 25, insert corner relief 35, a clamp pocket 31 and a threaded aperture 33 for the clamp screw 10. The side view shown in FIG. 6 is identical to that shown in FIG. 5, with the exception that a threaded section 17 has been added to the inner end 21.

FIG. 7 shows the profile of the insert seating surfaces 26 and 25. The separate chip breaker when used will seat against surface 27. FIG. 8 shows an end view of the outer end 23 of the insert seating device 5. The insert seating surfaces 25, which is the bottom surface, and the side wall seating surfaces 26, are indicated along with the pocket 31 for the clamp 7. As can be seen in this end view, the insert seating device 5 has a circular cross sectiion in this embodiment; however, other cross sections are possible.

Referring again to FIG. 4, it can be seen that the mechanism for advancing and retracting the cutting insert 11 in and out of the lateral walls 86 consists of a nut 15 which is located in the slot 13 which intersects the aperture 3. The insert holder 5 threadedly engages with the nut 15 such that when the nut 15 is rotated the insert holding device 5 will travel in and out along the aperture 3. Rotation of the insert seating device is prevented by clamp 42 and clamp 7.

As has already been noted, the design for this adjustable floating boring bar cartridge 1 may have only one of the insert seating devices 5 adjustable. The other insert seating device 5 which is non-adjustable may have a cylindrical shape, as shown in FIGS. 5 and 8, but it may also have a rectangular shape, as shown in FIGS. 9, 10, 11 and 12.

FIG. 9 shows a boring bar cartridge 90 which is also adjustable but is specifically designed for small diameter bores in which there is insufficient room for placing two insert seating devices as shown in FIGS. 5 and 6 end to end. FIGS. 9 and 10 show an insert seating device 92 which has a short length, holding insert 11. It has a top clamp 94 which abuts against the insert chip breaking structure 9, which may or may not be an integral part of the insert 11.

FIGS. 10 and 11 clearly show the insert seating surfaces 100 and 102, and the chip breaker abutment surfaces 104. These surfaces are shown spreading outwardly and are designed for acceptance of a triangular-like indexable insert and chip breaker.

This insert seating device 92 is joined to the cartridge 90 by two screws 106 which is threadedly engaged in threaded holes 108 in seating device 92. The insert clamp 94 is releasably held in clamp pocket 110 by a double ended screw 112 in which one end is threadedly engaged in clamp pocket hole 114 while the other end is threadedly engaged with the clamp 94.

An alternative embodiment of this invention would allow both insert seating devices 5 to be simultaneously adjustable inward and outward. This embodiment is shown in FIG. 13. Within a boring bar cartridge 1, two insert seating devices 5 are shown to have threaded ends 56 and 58 engaged in a threaded sleeve 50 which has oppositely threaded ends 52 and 54. Sleeve 50 is located in slot 60 which maintains the position of sleeve 50. Rotation of sleeve 50 simultaneously either draws the two insert seating devices 5 inward or outward, depending upon the direction of rotation of sleeve 50.

Returning again to FIGS. 4 and 5, it can be seen that the insert seating device 5 is specifically designed to be used with an indexable cutting insert 11. Indexable insert 11 is optimally comprised of a cemented hard carbide or multi-carbide composition. The cutting insert 11 is seated on insert seating surfaces 25 and 26. An insert chip breaking structure 9 is then placed on top of the cutting insert 11 since the cutting insert 11 does not have an integral chip breaking structure chip breaking surface 29 on chip breaker 9 slants upwardly and inwardly.

Bot the insert 11 and the chip breaker 9 are held in place on the insert seating device 5 by a top clam 7 which is threadedly engaged to the insert seating device 5 by a double ended screw 10 which is threadedly engaged in aperture 34 of the clamp 7 and a threaded aperture 33 in the insert seating device 5.

As is shown in FIG. 4, the cutting insert 11 optimally has a triangular-like shape when seen in top plan view. Each of the three cutting edges of said insert 11 is actually comprised of three angularly related edges, a lead edge 72 for aligning the cartridge initially in the bore, a side cutting edge 70, and a relief surface 74.

Returning now to FIGS. 1 and 2, it can be seen that the combination of seating devices 5, insert 11, chip breaker 9 and clamp 7 have been designed such that those parts of the items just enumerated which extend beyond the lateral faces 86 of the boring bar cartridge 1 have a shape which is similar to the shape of the lateral faces 86. In this manner, any interference that these parts may cause with chip flow is minimized and, therefore, jamming of chips between these sections is also minimized.

Modifications may be made within the scope of the appended claims.

What is claimed is:

1. An adjustable floating boring bar cartridge comprising: a boring bar cartridge having oppositely extending apertures, and each aperture having a substantially circular cross sectional configuration; means for releasably holding an indexable apertures, and having a cross sectional configuration similar to and substantially filling said substantially circular aperture cross sectional configuration; means for advancing and retracting said means for releasably holding said indexable cutting insert within said aperture such that a portion of said cutting insert may extend for a variable distance outside of said boring bar cartridge; recesses intersecting said oppositely extending apertures; and means for releasably clamping and orienting located in said recesses and abutting with said means for releasably holding said indexable inserts, said recesses and said means for releasably clamping and orienting are also located forward of said means for releasably holding said inserts, in both the sense of the direction in which said boring cartridge is to be driven and the direction in which it is to be rotated.

2. An adjustable floating boring bar cartridge according to claim 1 wherein said means for releasably holding said indexable insert has an inner and outer end, an insert seating surface located at said outer end, and a means for clamping said insert against said insert seating surface.

3. An adjustable floating boring bar cartridge according to claim 2 wherein: said means for advancing and retracting comprises a threaded portion located at the inner end of said means for holding an indexable insert; an adjustment nut threadedly engaged on said threaded portion; and said boring bar cartridge having a slot in which said adjustment nut is held.

4. An adjustable floating boring bar cartridge according to claims 1 or 3 wherein one of said means for holding said indexable insert is fixed in one of said oppositely extending apertures.

5. An adjustable floating boring bar cartridge according to claims 1 or 3 wherein said means for advancing and retracting said means for releasably holding said indexable insert comprises two separate means for advancing and retracting, each one of which operates independently of the other.

6. An adjustable floating boring bar cartridge according to claims 1 or 3 wherein said means for advancing and retracting simultaneously engages said means for releasably holding said indexable insert contained in each of said oppositely extending apertures.

7. An adjustable floating boring bar cartridge according to claim 1 further comprising an indexable cutting insert held in said means for releasably holding an indexable cutting insert.

8. An adjustable floating boring bar cartridge according to claim 1 wherein said indexable insert has a triangular-like top plan view.

9. An adjustable boring bar cartridge according to claims 7 or 8 further comprising a chipbreaking structure separate from said indexable cutting insert; said indexable insert having a top face; and said chipbreaking structure located on, and abutting, said top face.

10. An adjustable floating boring bar cartridge adapted to be held in boring bar head such that said cartridge may move freely in a lateral direction, and be driven in a forward direction long the axis of rotational symmetry of a workpiece bore while, at the same time, rotating about said axis, said cartridge comprising: a plate having a forward face; a rear face; two major side faces joining said rear face to said forward face; two lateral faces joining said forward face to said rear face and joining said two major side faces; said lateral faces each having an aperture extending laterally inward; said major side faces each having a recess intersecting one of said apertures; said major side faces having a slot communicating between said major side faces and one of said apertures; two indexable cutting inserts; means for releasably holding one of said indexable cutting inserts located in and substantially filling each of said apertures; said indexable cutting inserts mounted in said means for holding said inserts and extending laterally beyond said means for holding said insert and said lateral faces; means for releasably clamping and orienting located in said recesses and abutting with said means for releasably holding said inserts; and an adjusting nut rotatably mounted one of said means for holding said insert and located in said slot, to that rotation of said nut will laterally move said means for holding said insert.

11. An adjustable floating boring bar cartridge according to claim 10 wherein said means for releasably clamping and orienting are located forward of said means for releasably holding said inserts, in both the sense of the direction in which said boring cartridge is to be driven and the direction in which it is to be rotated.

12. A method of assembling an adjustable floating boring bar cartridge in preparation for loading into a boring bar head which is to be rotatably driven in a forward direction through a bore in a workpiece so as to enlarge said bore, said assembling of said adjustable boring bar cartridge comprising the steps of: clamping an indexable cutting insert having a cutting edge on to an adjustable first insert seating device having a threaded inner end; sliding said first insert seating device into a laterally facing first aperture in said floating boring bar cartridge; engaging said threaded inner end of said first insert seating device into a threaded adjusting nut residing in a slot in said cartridge communicating with said first aperture; orienting and holding non-rotatable said cutting edge of said insert by bringing an orienting clamp, residing in a recess in said cartridge, into abutment with an abutment surface on said first insert seating device; mounting a second insert seating device having an indexable cutting insert having a cutting edge into a second aperture in said cartridge, said second aperture is oppositely facing with respect to said first aperture; and moving said adjustable first insert seating device laterally by turning said nut on threaded end of said adjustable first insert seating device until said cutting edges of said cutting inserts held by said first and said second insert seating devices are separated by a specified distance.

* * * * *